Dec. 14, 1954     J. R. BRANT ET AL     2,696,732
DEVICE FOR TESTING SURGEON'S GLOVES
Filed May 20, 1950                      2 Sheets-Sheet 1

INVENTORS
JOHN A. BRANT and
BY ROY C. REID,

ATTORNEYS.

Dec. 14, 1954    J. R. BRANT ET AL    2,696,732
DEVICE FOR TESTING SURGEON'S GLOVES
Filed May 20, 1950    2 Sheets-Sheet 2
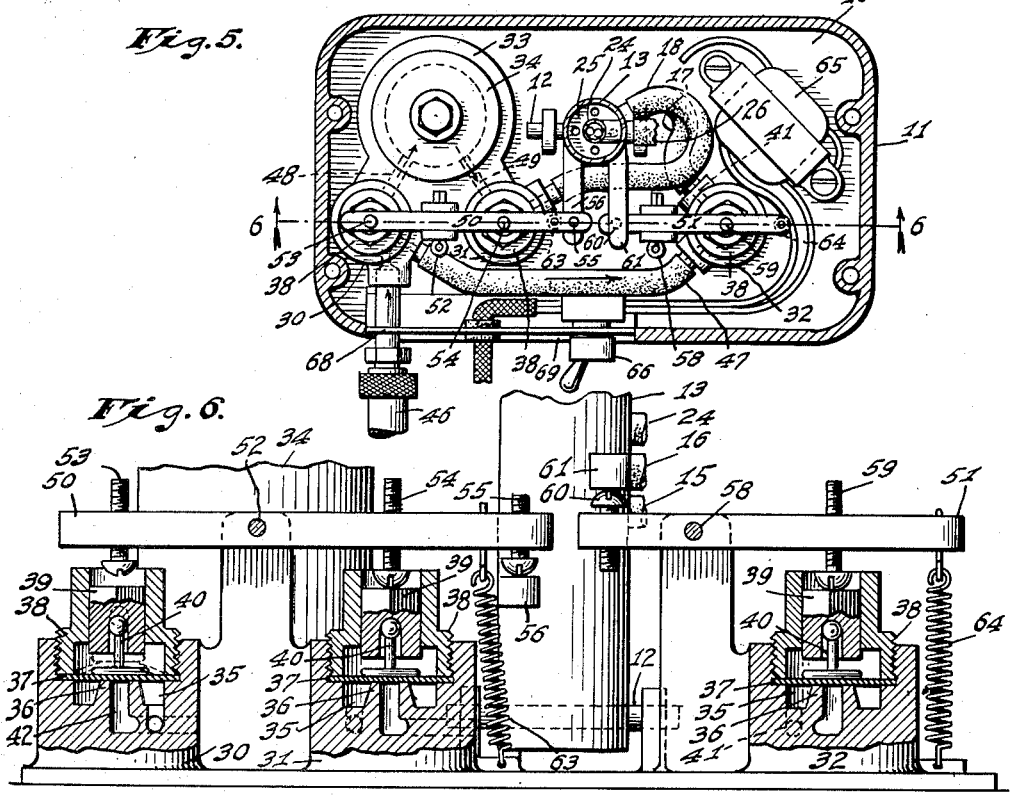
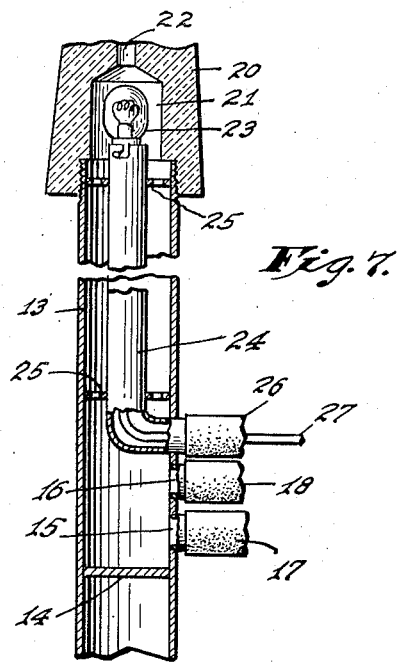
INVENTORS
JOHN R. BRANT and
BY ROY C. REID.
ATTORNEYS

United States Patent Office 2,696,732
Patented Dec. 14, 1954

2,696,732

DEVICE FOR TESTING SURGEON'S GLOVES

John R. Brant and Roy C. Reid, Indianapolis, Ind.; said Reid assignor to said Brant Application May 20, 1950, Serial No. 163,172

7 Claims. (Cl. 73—37)

It is the object of our invention to produce a device for use in testing surgical gloves to determine the presence of openings or weaknesses therein. More specifically, it is our object to produce a glove tester which will greatly facilitate and expedite the testing of surgical gloves. Another object of the invention is to produce a glove tester for inflating a glove or, alternatively, the individual fingers and thumb thereof with either an unlimited amount or a predetermined amount of gas under pressure. Still another object of the invention is to produce a glove tester which is of simple and durable construction and which can be operated without a high degree of skill.

In carrying out the invention we provide a standard equipped with a head adapted to be received within the glove to be tested, and in such standard we provide a passage for the admission of gas under pressure to the glove. Preferably, the device includes a chamber adapted to contain a measured and relatively small quantity of gas under pressure, and valve means are provided for connecting the passage through the standard either to such chamber or to a larger-capacity supply. Desirably, the standard is movable, is biased toward an intermediate position, and arranged to be moved in one direction from such intermediate position to connect the standard-passage with the small-volume chamber or in the other direction to connect it to the larger-capacity source. The head is desirably transparent and contains a light-source for the purpose of transilluminating the inflated glove.

Figure 1:
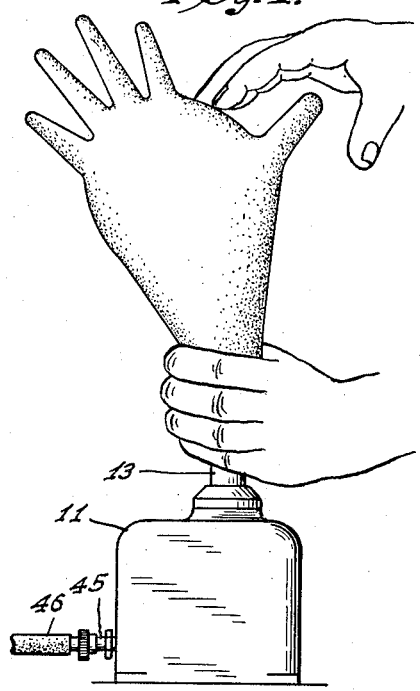
Figure 2:
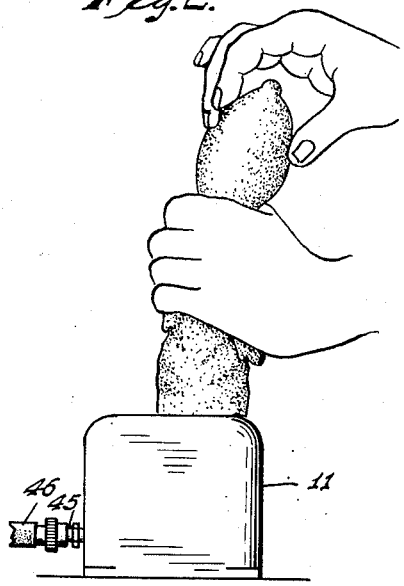
Figure 3:
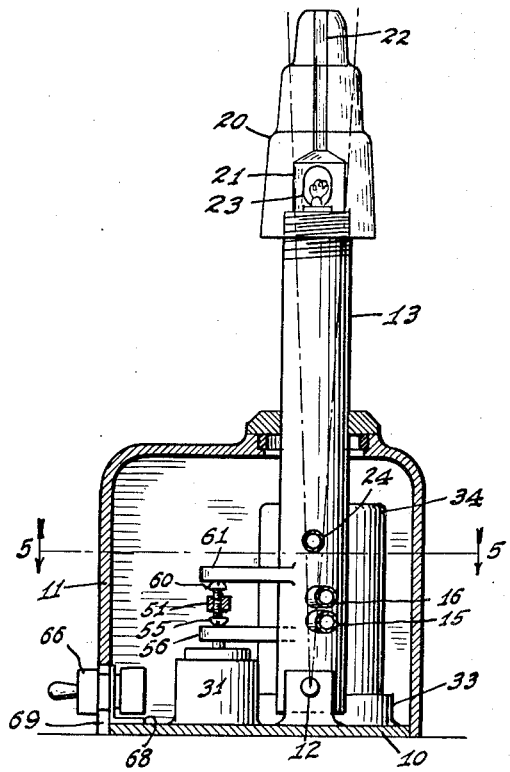
Figure 4:
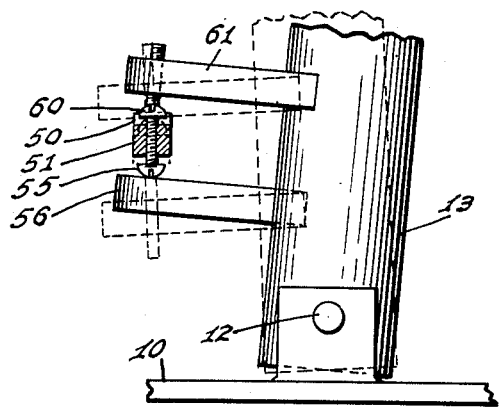

The accompanying drawings illustrate the invention: Fig. 1 is an end elevation of the device showing it in use for testing a whole glove; Fig. 2 is a similar view illustrating the device being used in the testing of a single glove-finger; Fig. 3 is a central vertical section through the tester; Fig. 4 is a fragmental view similar to Fig. 3, but on an enlarged scale; Fig. 5 is a horizontal section on the line 5—5 of Fig. 3; Fig. 6 is a fragmental vertical section on the line 6—6 of Fig. 5; and Fig. 7 is an axial section through the movable standard.

The device shown in the drawings comprises a base 10 and a removable cover 11 held in place on the base in any convenient manner. Pivotally mounted on the base, as by a pivot pin 12, is a vertical standard 13 conveniently formed of metal tubing. Near its lower end (Fig. 7) but above the pivot 12 the standard 13 is provided interiorly with a disk or closure 14 which seals the upper portion of the tube off from the open lower end. Above the disk 14, the standard is provided with two laterally projecting nipples 15 and 16 adapted for connection to flexible hoses 17 and 18 through which gas under pressure may be admitted to the interior of the standard.

At the upper end of the standard, there is attached thereto a head 20, preferably of transparent material and having portions of successively decreasing diameter, as will be clear from Fig. 3. At its lower end, the head 20 has a central recess 21 which communicates with the interior of the standard 13 and with a central passage 22 which extends upwardly through the head and opens in the upper end thereof. The recess 21 provides a space for the reception of a light-bulb 23, shown as mounted on the upper end of a tube 24 which extends downwardly into the standard 13 within which it is located by collars 25. Conveniently, the lower end of the tube 24 is bent at right angles and extends outwardly through the wall of the standard 13 for connection to the insulating sheath 26 of an electrical conductor 27 through which current is supplied to the bulb 23. If collars 25 are employed to mount the tube 24, such collars are perforated to permit the passage of gas under pressure from the nipples 15 and 16 upwardly through the standard and recess 21 to the passage 22.

The base 10 is provided with three upwardly projecting valve bosses 30, 31, and 32 and with a fourth boss 33 serving as a closure for an inverted cup-like gas-reservoir 34. Each of the valve bosses is formed with an upwardly opening recess 35 into which a central valve-seat 36 projects upwardly. Each recess 35 is counterbored to receive a valve disk 37 of flexible material held in place by a screw-threaded plug 38 providing a guide for a vertically slidable valve-operator 39. If desired, a thrust member 40 may be interposed between each valve-operator 39 and the associated valve disk 37. In each of the valves 30, 31, and 32, the recess 35 serves an inlet chamber, while a passage 41 in the valve seat 36 serves as an outlet duct, communication between the inlet chamber and outlet duct being interrupted when the valve disk 37 is seated on the valve seat. Horizontal holes drilled in the bosses provide for the connection of the inlet chamber and outlet duct of each valve to other elements of the apparatus.

Supported from the base is an inlet fitting 45 adapted for connection to a flexible hose 46 extending to a large-volume source of gas under pressure. Preferably, the gas-source is a commercial gas-cylinder charged to high pressure with an inert gas, such as nitrogen. The inlet fitting 45 communicates with the inlet chamber 35 of the valve 30 and also, conveniently through that inlet chamber and a flexible hose 47, with the inlet chamber 35 of the valve 32. The outlet duct 42 of the valve 30 and the inlet chamber 35 of the valve 31 communicate with the interior of the reservoir 34 through holes 48 and 49 drilled in the base 10. The outlet ducts of the valves 31 and 32 communicate respectively with the flexible hoses 17 and 18 which, in turn, communicate with the interior of the vertical standard 13.

It will be evident from Fig. 6 that fluid pressure within the chamber 35 of any valve will urge the associataed valve-disk upwardly, thus tending to move it out of contact with the valve seat 36 and permit free communication between the inlet chamber 35 and the outlet duct 42. Seating of the valve disks is desirably controlled by movement of the standard 13 about its pivot pin 12. For this purpose, the valve-controlling mechanism illustrated in Fig. 6 is conveniently employed. Such mechanism comprises a pair of pivoted levers 50 and 51, the former of which jointly controls the valves 30 and 31 and the latter of which controls the valve 32. The lever 50 is pivotally supported from the base 10 on a pivot pin 52 located between the two valves 30 and 31 and is provided with abutments, preferably adjustable screws 53 and 54, engageable respectively with the valve-operators 39 of the valves 30 and 31. Beyond the valve 31, the lever 50 is provided with an adjustment screw 55 engageable with the upper surface of an arm 56 which is rigid with and projects rearwardly from the standard 13. The lever 51 is pivotally supported from the base 10 by a pivot pin 58 located between the valve 32 and the standard 13. An abutment 59, preferably in the form of an adjustable screw, is carried by the arm 51 in position to engage the valve operator 39 of the valve 32. On the opposite side of the pivot pin 58, the lever 51 carries an adjustable screw 60 engageable with the lower surface of an arm 61 rigid with and projecting from the standard 13. Tension springs 63 and 64 act respectively on the levers 50 and 51 to urge the screws 55 and 60 toward engagement with the arms 56 and 61.

It will be obvious from the construction so far described that the spring 63 will tend to cause closing of the valve 31 and opening of the valve 30, while the spring 64 will tend to close the valve 32. Movement of each lever 50 and 51 under the influence of its associated spring is limited by seating of the valve disk 37 on the seat 36 of the closed valve. By proper adjustment of the screws 54, 55, 59, and 60, the position occupied by the standard 13 while the valves 31 and 32 are closed can be controlled as desired. Preferably, such position of the standard 13, which will hereinafter be referred to as its neutral position, is a vertical position, as illustrated in Fig. 3. The screw 53 is so adjusted that with the valve 31 closed by the spring 63 the valve disk 37 of the valve 30 will be free to move upwardly under the influence of pressure in the inlet chamber 35.

If the standard 13 is swung in a clockwise direction or forwardly from its neutral position into the full-line position shown in Fig. 4, the arm 56 on the standard will swing the lever 50 in the counterclockwise direction to cause closing of the valve 30. Such movement of the standard 13 is without effect on the arm 51, which remains in a position to hold the valve 32 closed. If the standard 13 is swung in a counterclockwise direction or rearwardly from its neutral position into the dotted-line position shown in Fig. 4, the arm 56 moves away from the screw 55 while the arm 61 causes the lever 51 to swing in a counterclockwise direction and permit opening of the valve 32.

When the device is not in use, the standard 13 occupies its neutral position, as shown in Fig. 3. If the inlet fitting 45 is connected to a supply of gas under pressure, such gas flows into the inlet chamber 35 of the valve 30, forces the valve disk 37 upwardly, and passes through the duct 42 and hole 48 into the reservoir 34. Egress of gas from the reservoir 34 is prevented by reason of the fact that valve 31 is closed, with the result that the reservoir 34 contains a predetermined, relatively small volume of gas under pressure. By swinging the standard 13 forwardly into the full-line position shown in Fig. 4, the valve 30 is closed, and the predetermined quantity of gas in the reservoir 34 flows through the valve 31 into the standard 13. If the standard 13 is rocked rearwardly from its neutral position into the dotted-line position shown in Fig. 4, the valve 31 remains closed, the reservoir 34 remains filled with gas under pressure, and the valve 32 is permitted to open, thus providing for the flow of gas in substantially unlimited quantity from the inlet fitting 45 through the inlet chamber 35 of the valve 30, the hose 47, the valve 32, and the hose 17 to the standard 13.

To inflate an entire glove, the cuff of the glove is placed over the head 20 and held in contact therewith by the hand of the operator, as illustrated in Fig. 1. If the standard is then moved rearwardly, the valve 32 is opened and gas is supplied to the standard and through the head 20 to inflate the entire glove to any desired extent. To test individually the thumb or any finger of the glove, the base of such thumb or finger is brought into association with the head 20 and held there by the hand of the operator, as shown in Fig. 2; and the standard 13 is then moved forwardly to open the valve 31 and to close the valve 30 thus permitting the measured quantity of gas in the reservoir 34 to flow through the standard 13 and head 20 into the individual finger or thumb being tested. The provision of a measured quantity of gas which can be admitted to an individual finger or thumb of the glove is highly convenient, as it prevents overinflation.

The light bulb 23 is conveniently a low-voltage bulb supplied through a step-down transformer 65 on the base 10, current to the transformer being controlled by a switch 66 mounted on the base in position to be accessible for operation from outside the cover 11. Conveniently, the inlet fitting 45, the switch 66, and the supply wires 67 for the transformer 65 are all supported from a bracket 68 secured to the base in line with a notch 69 in the rear wall of the cover 11.

We claim as our invention:

1. In a glove-tester, a movably supported head adapted to have a glove or glove-portion drawn over and held in engagement with it, said head having a passage for admitting gas under pressure to inflate the associated glove or glove-portion, an inextensible gas reservoir adapted to contain a fixed quantity of gas under predetermined superatmospheric pressure, a conduit connecting said reservoir and passage, a valve in said conduit, and means controlled by movement of said head for operating said valve.

2. In a glove-tester, a head adapted to have a glove or glove-portion drawn over and held in engagement with it, said head having a passage for admitting gas under pressure to inflate the associated glove or glove-portion, an inextensible gas reservoir adapted to contain a fixed quantity of gas under pressure, a conduit connecting said reservoir and passage, a second conduit communicating with said reservoir and adapted for connection to a container for a supply of gas under superatmospheric pressure, a valve in each of said conduits, and common means for operating said valves in opposite senses.

3. The invention set forth in claim 2 with the addition that said head is movably supported, and means controlled by movement of said head for operating said valve-operating means.

4. In a glove-tester, a head adapted to have a glove or glove-portion drawn over and held in engagement with it, said head having a passage for admitting gas under pressure to inflate the associated glove or glove-portion, an inextensible gas reservoir adapted to contain a fixed quantity of gas under predetermined superatmospheric pressure, a conduit connecting said reservoir and passage, a second conduit communicating with said passage independently of said reservoir and first conduit and adapted for connection to a supply of gas of superatmospheric pressure, and a valve in each of said conduits.

5. The invention set forth in claim 4 with the addition that said head is supported for movement alternatively in either of two directions from a neutral position, said tester including valve-operating means controlled by movements of said head, operative when said head is in neutral position to cause closing of both valves, operative when said head is moved from neutral position in one direction to open one of said valves, and operative upon head-movement in the other direction to open the other valve.

6. The invention set forth in claim 4 with the addition of a control member movable alternatively in either of two directions from a neutral position, said tester including valve-operating means controlled by movements of said member, operative when said member is in neutral position to cause closing of both valves, operative when said member is moved from neutral position in one direction to open one of said valves, and operative upon member-movement in the other direction to open the other valve.

7. In a glove-tester, a head adapted to have a glove or glove-portion drawn over and held in engagement with it, said head having a passage for admitting gas under pressure to inflate the associated glove or glove-portion and being movably mounted, a conduit communicating with said passage and adapted for connection to a source of gas under pressure, a valve in said conduit, and valve-operating means operatively connected to said valve and controlled by movement of said head.

References Cited in the file of this patent

UNITED STATES PATENTS

| Number | Name | Date |
|---|---|---|
| 1,988,945 | Hansen | Jan. 22, 1935 |
| 2,126,434 | Vosbury | Aug. 9, 1938 |
| 2,370,945 | Fields | Mar. 6, 1945 |
| 2,414,196 | Geldhof et al. | Jan. 14, 1947 |
| 2,467,767 | Mertler | Apr. 19, 1949 |
| 2,543,911 | Isaacs | Mar. 6, 1951 |